United States Patent [19]

Marsch

[11] Patent Number: 5,362,453
[45] Date of Patent: Nov. 8, 1994

[54] REFORMER FOR THE GENERATION OF SYNTHESIS GAS

[75] Inventor: Hans-Dieter Marsch, Dortmund, Germany

[73] Assignee: Uhde GmbH, Dortumundl, Germany

[21] Appl. No.: 74,256

[22] Filed: Jun. 9, 1993

[30] Foreign Application Priority Data

Jul. 3, 1992 [DE] Germany .............................. 4221837

[51] Int. Cl.⁵ .............................. B01J 8/06; C10J 3/00
[52] U.S. Cl. ....................................... 422/197; 48/54; 48/127.9; 48/214 R
[58] Field of Search ..................... 422/196, 197; 48/95, 48/127.1, 127.5, 127.7, 189.2, 214 R, 94, 127.9

[56] References Cited

U.S. PATENT DOCUMENTS

| | | | |
|---|---|---|---|
| 2,579,843 | 12/1951 | Mader | 422/197 |
| 3,375,288 | 3/1968 | Rosset | 422/197 |
| 3,547,188 | 12/1970 | Kuhnlein | 422/197 |
| 4,240,805 | 12/1980 | Sederquist | 48/214 R |
| 4,731,098 | 3/1988 | Marsch | 48/95 |
| 4,741,885 | 5/1988 | Herbort et al. | 422/196 |

*Primary Examiner*—Robert J. Warden
*Assistant Examiner*—L. M. Crawford
*Attorney, Agent, or Firm*—Anderson Kill Olick & Oshinsky

[57] ABSTRACT

A device for the generation of synthesis gas with a plurality of catalyst-filled reformer tubes suspended in a pressure vessel, the reformer tubes being at least partially enveloped by jacket tubes intended to conduct product gas in an upward direction from a lower mixing chamber into the head space of the pressure vessel, the intended purpose of said device being to provide a solution, in particular for improving the mixing of the ensuing streams while simultaneously equalizing the heat transfer by mechanically simple and economical means.

This is achieved by making the jacket tubes protrude beyond the ends of the reformer tubes thus forming an individual mixing chamber for each reformer tube.

5 Claims, 4 Drawing Sheets

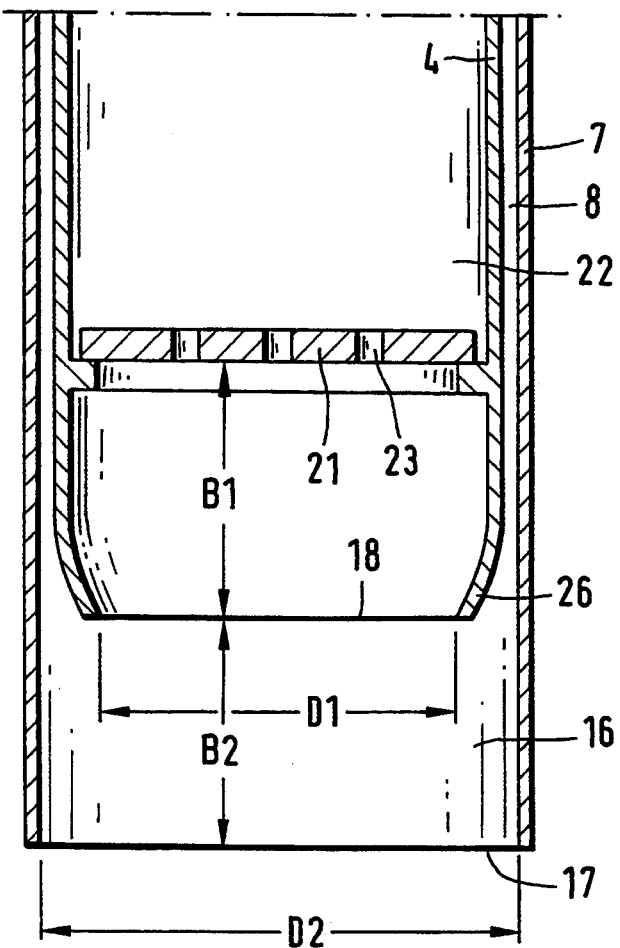

REFORMER FOR THE GENERATION OF SYNTHESIS GAS

BACKGROUND OF THE INVENTION

The invention relates to a reformer for the generation of synthesis gas, equipped with a plurality of catalyst-filled reformer tubes suspended in a pressure vessel, at least a section of each reformer tube being provided with a jacket tube, the purpose of which is to form a duct for the product gas flowing upwards from a lower mixing chamber to the head space of the pressure vessel.

Reformers of this type are known, for example, from the applicant's patent specifications DE-35 32 413-A, DE-36 05 811-A or DE-38 13 864-A, whereas EP-0 171 786 or U.S. Pat. No. 4,337,170offer comparable solutions.

In such a technology for synthesis gas generation, convective reformers of this type are equipped with reformer tubes which are filled with catalyst. A mixture of steam and hydrocarbons is fed to these tubes, is heated therein, and thus is converted to a gas containing $H_2$ and CO, its temperature at the outlet from the reformer tube being at least 680° C. and the pressure being elevated. The heat required for the endothermal reaction is provided by another source. All such sources have in common for the present application that this source is a gas of a higher temperature than, and about the same pressure as, the gas leaving the reformer tubes, but the molar mass flow rate of which is mostly greater than that of the gas leaving the reformer tubes. A further feature is that the gas of said source is also a $H_2$/CO-bearing gas, but with a lower content of residual methane. The product gas used as heating gas is formed when the two streams are mixed before it is used as the source of heat for the reaction in the reformer tubes of the convective reformer.

Example
  Gas at the outlet of the reformer tubes: molar mass flow rate=1059 kmol/h at a temperature of 700° C. and a pressure of 21.1 bar.
  Gas from the heat source: molar mass flow rate of 2532 kmol/h at a temperature of 880° C. and a pressure of 21.1 bar
  Mixture=product gas=heating gas: molar mass flow rate=3591 kmol/h at a temperature of 816° C. and a pressure of 21.1 bar To achieve the required yield of $H_2$ and CO and, consequently, the required lowering of the residual methane content in the product gas, it is essential that all the reformer tubes of the convective reformer be heated as uniformly as possible, so that the residual methane contents of the gas streams leaving the individual reformer tubes differ from each other as little as possible.

It is assumed that suitable measures are employed to achieve a uniform gas distribution among the individual reformer tubes. This can be achieved, for instance, by installing defined pressure-reducing means in the feed lines, a method that is used, for example, in the construction of steam generators (installation of restriction orifice plates). For reasons of energy conservation, it is even more important to minimize the pressure drop on the shell side without impairing the efficiency of heat transfer.

The object of the invention is to find a solution, with the aid of which the mixing, in particular, of the ensuing streams is improved, while simultaneously equalizing the heat load, which acts on the reformer tubes, by mechanically simple and economical means.

SUMMARY OF THE INVENTION

The object of the invention is achieved in that the tubes jacketing the reformer tubes protrude beyond the end of the reformer tubes, thus forming individual mixing chambers for each reformer tube.

In view of the fact that the tube which jackets the reformer tube protrudes beyond the end of the reformer tube in the direction of the force of gravity, a self-regulating distribution tray of strong individual elements is formed, the individual feed quantities remaining unaffected by the jets leaving the reformer tubes. It is simultaneously ensured that the gas from the reformer tube remains allocated to the tube and thorough mixing is achieved. According to the present invention, the use of tubular elements as the heat exchange device has the advantage of strength and dimensional stability, which feature is further enhanced by suitable guide elements of a known nature being connected to the reformer tube in order to obtain a uniform annular flow gap.

An embodiment of the invention provides for the jacket tubes to protrude beyond the ends of the reformer tubes by a length equal to at least eight times the equivalent diameter of the reformer tube outlet, thereby ensuring in particular that the gas streams leaving the reformer tube cannot escape from the mixing chamber at all or only in insignificant quantities.

The invention further provides for the free end of the jacket tube being closed by a plate with an opening allowing the passage of gas.

This additional measure serves to ensure the uniformity of the flow conditions of the gas from the heat source to the individual mixing chambers without an appreciable pressure drop, as the open end of the second tube is closed by a plate with one or more openings, the total cross-sectional area of which is preferably such that the flow velocity of the second heat source gas intended for heating the individual reformer tube at this point is not greater than 1.5 times the outlet flow velocity in the flow gap. Such a measure is advantageous, particularly when the mass flow rate of the gas from the heat source approaches the mass flow rate of the gas leaving the reformer tubes.

According to the invention it is also possible for the reformer tube to extend beyond the catalyst grid with outlet openings and to taper at its free end, the jacket tube protruding beyond the free end of the reformer tube.

Finally, provision can be made for the lower open end of the reformer tube to be at a distance of "B1=0.5 to 2 times D1" from the catalyst grid outlet openings, D1 being the inside diameter of the lower open end, and the lower open end of the jacket tube being at a distance of B2 from the lower open end of the reformer tube, B2 being at least (D2+0.5×D1), D2 being the inside diameter of the lower jacket tube end. This particular variant has the advantage that two definite tube streams are created which impinge upon each other and mix in the process.

BRIEF DESCRIPTION OF THE DRAWINGS

The invention is described in more detail with the aid of the drawing by way of example. In the drawings:

FIG. 5 is a cross-sectional view of a third variant of the lower ends of the reformer/jacket tubes,

DETAILED DESCRIPTION OF THE PREFERRED EMBODIMENT

Figure 1:
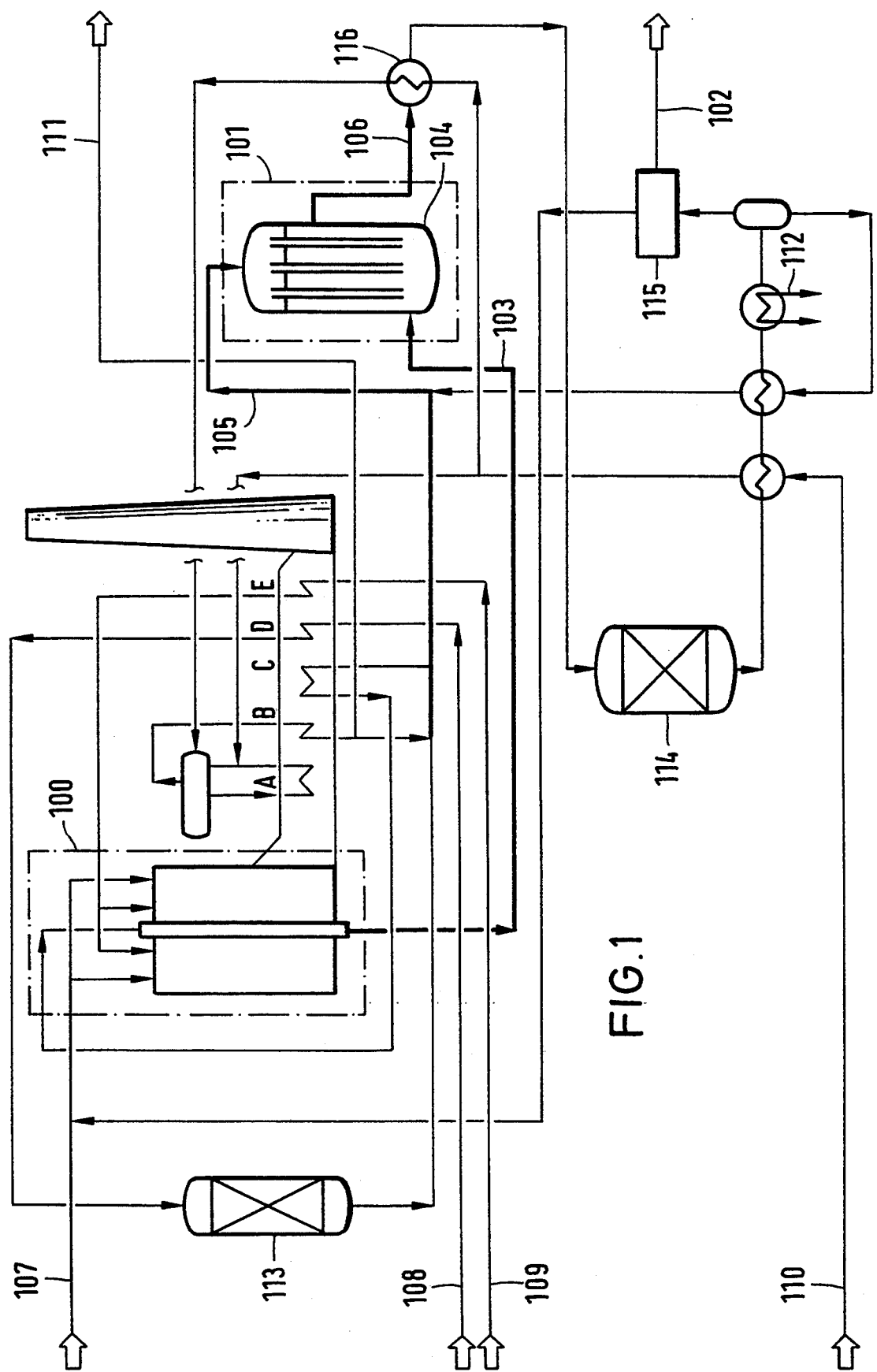
FIG. 1 is a simplified diagrammatic view of a plant for the production of hydrogen with a device according to the present invention.

FIG. 1 illustrates as an example a process for the production of hydrogen 102 using a conventional steam reformer unit 100 and a convective reformer unit 101 according to the present invention. In this example, the conventional steam reformer unit 100 represents the heat source for the convective reformer unit 101. Other heat sources are, of course, conceivable, e.g. a partial oxidation or a catalytic partial oxidation unit. In the example illustrated here, the $H_2/CO$-rich gas obtained in the conventional steam reformer unit 100 is fed to the convective reformer unit 101 via line 103 and, after mixing with the $H_2/CO$-rich gas from the reformer 104, it is used for heating the latter. In the convective reformer unit 101, a steam/hydrocarbon mixture is fed to the reformer 104 via line 105. After dissipating a large part of its sensible heat, the mixture of the two $H_2/CO$-rich gases described above leaves the convective reformer unit 101 in the form of product gas at a temperature of approximately 600° C., preferably less than 600° C., and flows to further processing facilities via line 106.

The other designations in FIG. 1 mean: Fuel 107, hydrocarbon 108, combustion air 109, boiler feed water 110, export steam 111, cooling water 112, desulphurization reactor 113, CO shift converter 114, and pressure-swing adsorption unit 115. The waste heat recovery facilities downstream of the conventional steam reformer unit 100 comprise steam generator A, steam superheater B, hydrocarbon/steam preheater C, hydrocarbon preheater D and combustion air preheater E.

Figure 2:
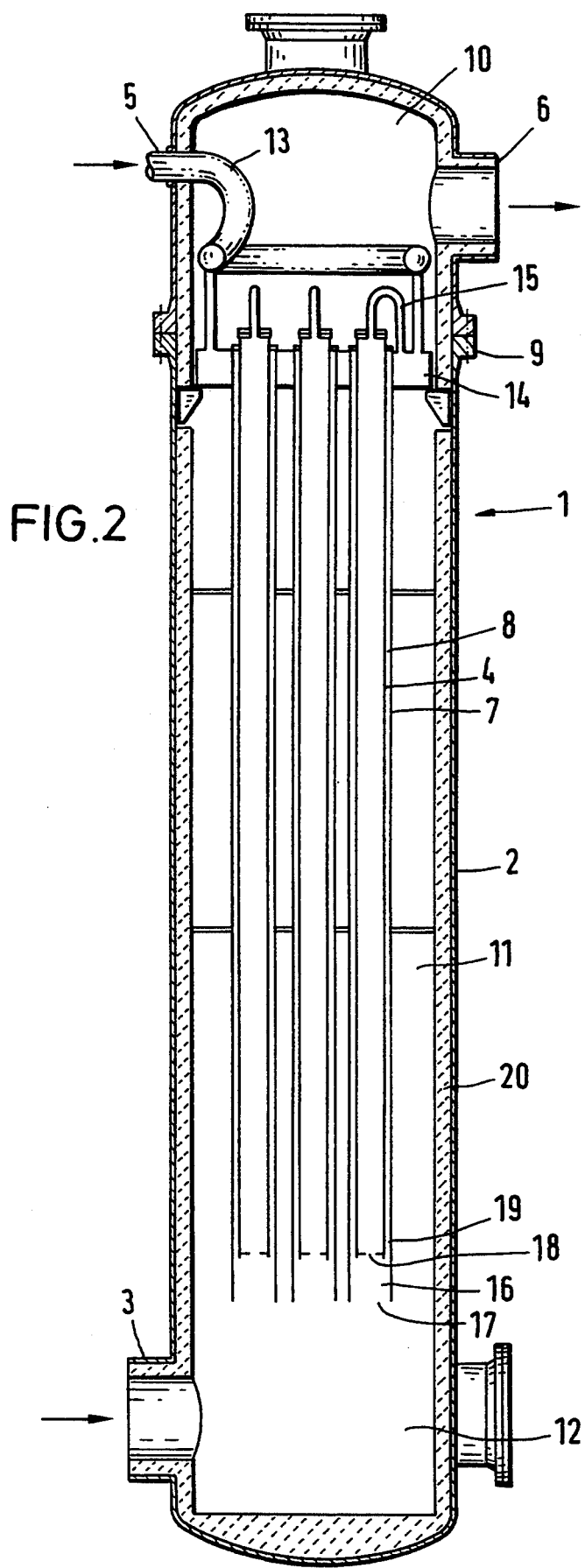
FIG. 2 is a cross-sectional simplified, view of the device according to the present invention.

FIG. 2 illustrates a reformer 1 according to the invention. It consists of a cylindrical pressure vessel 2 with inlet nozzle 3 for introducing a $H_2/CO$-rich gas as the heat source, with an inlet nozzle 5 for admitting a steam/hydrocarbon mixture and an outlet nozzle 6 for the cooled product gas. Inside the pressure vessel there are the catalyst-filled reformer tubes 4. Each reformer tube 4 is jacketed by a jacket tube 7, leaving a flow gap 8. Reformer tube 4 and jacket tube 7 are mechanically joined at the upper end and fixed in the carrier plate 9 which separates the head space 10 from the convective reforming zone 11 and the bottom space 12, the bottom space 12 and head space 10 being nevertheless connected via flow gaps 8. Within head space 10, at least one line 13 connects inlet nozzle 5 with the hollow space 14 of carrier plate 9. The steam/hydrocarbon mixture is distributed among the reformer tubes 4 from the hollow space 14 through a plurality of short connecting lines 15. It flows through the catalyst-filled reformer tubes 4 from top to bottom and is heated in the process and thereby reformed to a $H_2/CO$-rich gas mixture. The heat is supplied by the product gas flowing upwards through the flow gap 8. Each reformer tube end has its own mixing chamber 16. The mixing chamber is delimited by the lower open end 17 of jacket tube 7, which is lower than the lower open end 18 of the reformer tube 4, by this lower open end 18, the inlet 19 to the flow gap 8 and protrusion A of the jacket tube 7.

This construction ensures that no gas can pass from the reformer tubes 4 into the bottom space 12 and that the gas stream flowing into the bottom space via inlet nozzle 3 is distributed uniformly among the individual mixing chambers 16.

A refractory insulating layer 20 serves to protect the walls of the pressure vessel from the prevailing high temperatures.

Figure 3:
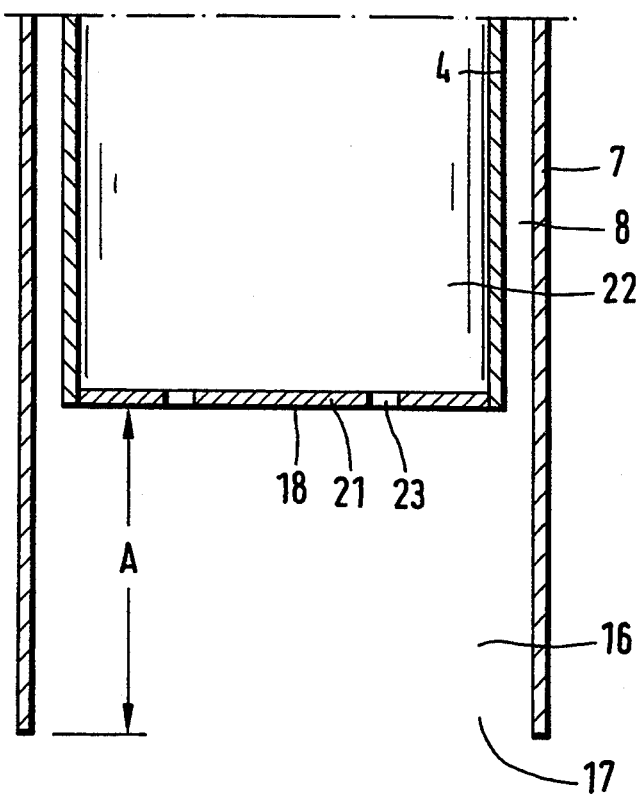
FIGS. 3 is across-sectional view of a first variant of the lower ends of the reformer/jacket tubes.

FIG. 3 shows, in a first embodiment, an example of a construction of the individual mixing chamber 16. The open end 18 of the reformer tube 4 is fitted with a catalyst grid 21, the purpose of which is to retain the catalyst 22 in the reformer tube 4. Holes 23 are provided in catalyst grid 21, these holes being smaller than the catalyst particles, but big enough to allow the gas to pass into the mixing chamber 16. Jacket tube 7 envelops the reformer tube 4 with an annular gap, said gap being the flow gap 8, the lower end 17 of the jacket tube being spaced by distance A from the lower open end 18 of reformer tube 4, in this example characterized by the lower edge of the catalyst grid 21. It is evident that other constructions of the open end 18 are conceivable without departing from the basic idea of the invention. Thus, it is possible, for instance, to install a second tray in addition to the catalyst grid 21, arranging it below the catalyst grid, said tray being provided with holes, the size of which does not depend on the catalyst particle size. It is equally possible to provide a small chamber below the catalyst grid 21 for collecting the gas from reformer tube 4, numerous construction variants being possible for said collecting chamber, and to locate the holes 23 mentioned above in a cylindrical section, the outlet flow then being in a horizontal direction.

Figure 4:
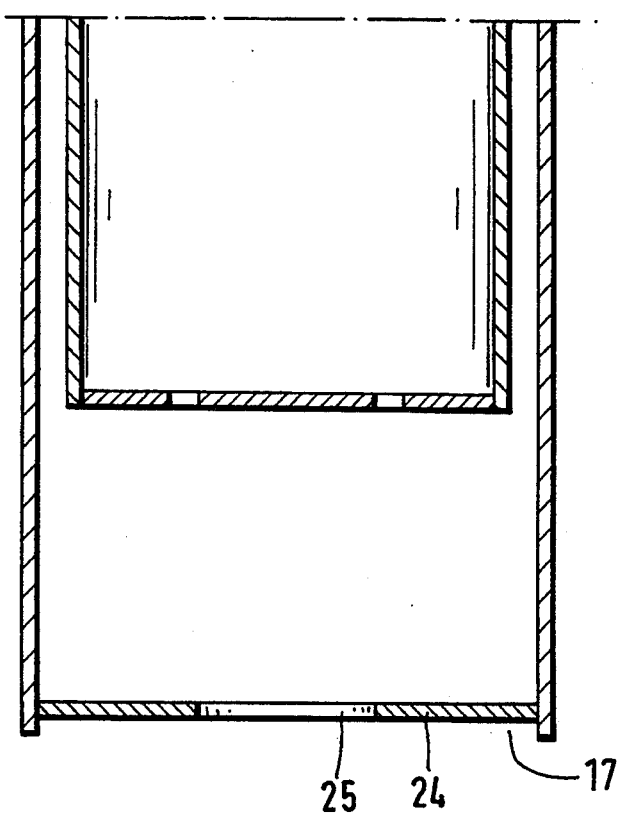
FIG. 4 is a cross-sectional view of a second variant of the lower ends of the reformer/jacket tubes.

A further embodiment of the construction according to FIG. 3 is illustrated in FIG. 4, in which the flow conditions from the bottom space 12 to the mixing chamber 16 are further favourably affected while the pressure drop is kept negligibly small. In FIG. 4, therefore, open end 17 is fitted with a plate 24 with an opening 25. The size of opening 25 is such as to limit the velocity, at this point, of the gas intended for the individual reformer tube 4 to a value that does not exceed 1.5 times the velocity at the outlet from the flow gap 8. Of course, it is also possible to produce the intended effect by opening 25, i.e. by tapering the jacket tube 7 or by fitting one or more appropriate precision tubes in plate 24. Likewise, providing several small openings instead of opening 25 will achieve the same result.

FIG. 5 features a tubular element 26 below the catalyst grid 21 in prolongation of the reformer tube 4. The gas leaving outlet openings 23 is first bundled and, after passing through section B1, it leaves the element 26 at its lower open end 18, having an inside diameter of D1. A larger quantity of gas at a higher temperature flows in the opposite direction through the open end 17 of the jacket tube 7. The two gas jets impinge upon each other in the mixing chamber 16 and mix before flowing into flow gap 8 for heating reformer tube 4.

I claim:

1. A reformer for generating synthetic gas, comprising:
    a pressure vessel having spaced a lower mixing chamber, a head space, a gas mixture inlet, a heat gas inlet, and a product gas outlet;
    a plurality of catalyst-filled reformer tubes suspended in said pressure vessel and extending down to said lower mixing chamber;

a plurality of jacket tubes for covering said plurality of reformer tubes, respectively, and extending up to said head space to form, with said reformer tubes, a plurality of ducts for flowing product gas from said lower mixing chamber to said head space, each of said jacket tubes extending beyond a lower end surface of a respective reformer tube to thereby form an individual mixing chamber for the respective reformer tube.

2. A reformer according to claim 1, wherein a lower section of each reformer tube is provided with a grid having a plurality of outlet openings, said jacket tubes protruding beyond the lower sections of said reformer tubes by a length equal at least eight times an equivalent diameter of a respective largest reformer tube outlet opening.

3. A reformer according to claim 1, wherein a lower open end of each jacket tube is closed with a plate having an opening.

4. A reformer according to claim 1, wherein a lower section of each reformer tube is provided with a grid having a plurality of outlet openings, and wherein each reformer tube protrudes beyond the grid and is tapered at an end portion of the lower section thereof.

5. A reformer according to claim 4, wherein the end surface of the end portion is located at a distance from an outer end surface of said grid equal 0.5 to 2 times of an inside diameter of the reformer tube at said end surface, and wherein an end surface of a lower end of each jacket tube is located at a distance from the end surface of the lower end portion of the reformer tube at least equal a sum of an inside diameter of the jacket tube at the end surface of the lower end thereof and a half of the inside diameter of the reformer tube at the end surface of the lower end of the reformer tube.

* * * * *